Sept. 19, 1967   M. J. KLYGIS ETAL   3,342,383
DISPENSER FOR GRANULAR MATERIALS
Filed Sept. 17, 1965
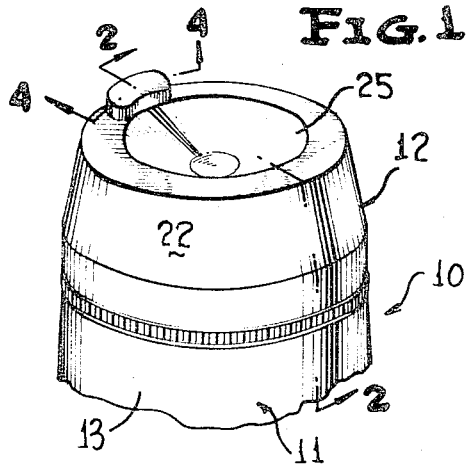
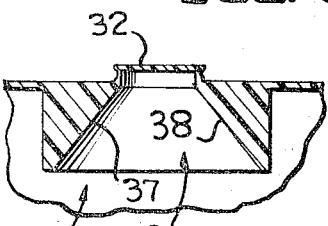
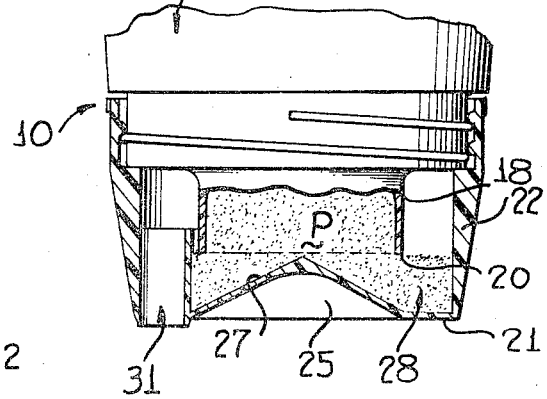
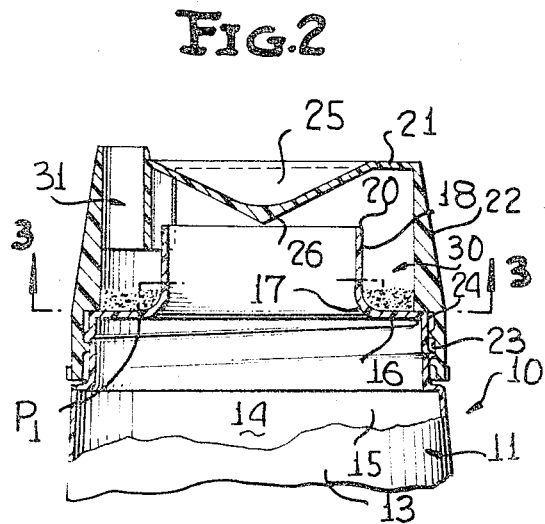
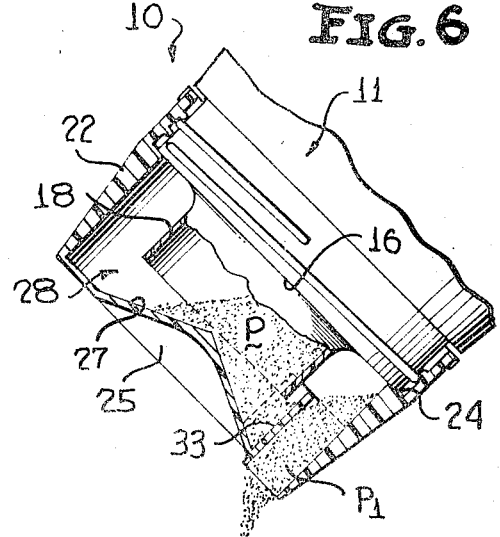
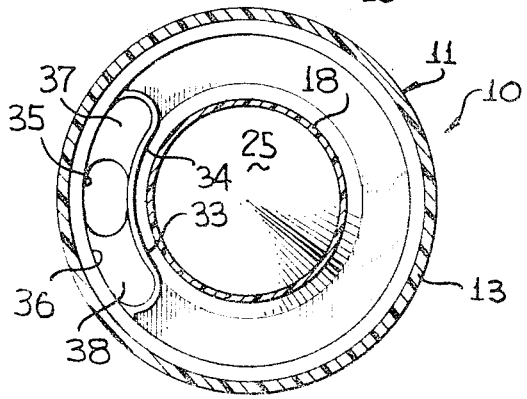
INVENTORS
MINDAUGAS J. KLYGIS &
WILLIAM F. LODDING.
BY Mason, Porter, Diller & Brown
ATTORNEYS

United States Patent Office 3,342,383
Patented Sept. 19, 1967

3,342,383
DISPENSER FOR GRANULAR MATERIALS
Mindaugas J. Klygis, Chicago, and William F. Lodding, Orland Park, Ill., assignors to Continental Can Company, Inc., New York, N.Y., a corporation of New York
Filed Sept. 17, 1965, Ser. No. 487,982
7 Claims. (Cl. 222—454)

This invention relates to a novel dispensing container or dispenser formed solely of a container body and a dispensing closure, and is particularly directed to a novel and cooperative arrangement of the closure and dispensing body permitting a predetermined volume of granular material packaged in the container to be dispensed during each dispensing operation of the dispenser.

It is known to form containers for dispensing either liquid or dry products, and in either case such dispensing containers are generally of a three-part construction including a container body and a pair of caps which are rotatable relative to each other. One of the caps is provided with one or more openings and is secured to a neck of the container while a second of the caps, generally an outermost cap, is telescoped externally of the first cap and is similarly provided with dispensing openings.

Such conventional dispensing containers include many inherent disadvantages as, for example, the relative high cost of manufacturing each of the three elements and thereafter preassembling the two caps, as is customary, and then assembling the preassembled caps upon the container. From both a practical and economical standpoint it can be recognized that to construct such conventional dispensing containers from less than the usual three components would be highly desirable from a manufacturing standpoint, particularly if a dispensing container of fewer than three components is as efficient and commercially acceptable as known dispensing containers. Furthermore, in the case of dispensing containers formed from plastic material by known molding processes, the fewer components required represents a significant saving in the cost of manufacturing as well as the generally high cost of each individual molding die in which the components are molded.

A further disadvantage in such known dispensing containers is the inability thereof to continually dispense an accurate predetermined volume of the particular material packaged in the container, as well as to prevent undesired product leakage prior to, during or after a dispensing operation.

It is, therefore, a primary object of this invention to provide a novel dispensing container or dispenser which is of a two-piece construction including a container body and a single closure with the container body and closure being constructed to accurately and continually dispense a predetermined volume of preferably a granular dry product and at the same time prevent product leakage in a manner heretofore unprovided for in conventional prior art dispensers.

A further object of this invention is to provide a novel dispensing container of the type immediately above-described including means forming a portion of the closure for directing granular material in a radially outward direction into a chamber upon the tipping of the container from a normally upright position to an inverted position insuring that a predetermined volume of material is at all times dispensed from the container body and subsequently a predetermined volume of the material in the chamber is dispensed outwardly through a dispensing opening of the dispenser.

Still another object of the invention is to provide a novel dispensing container of the type just described in which a second chamber is provided for receiving material from the first chamber upon the tipping of the dispenser to an upright position, and means are provided for preventing the leakage of the material from the second chamber prior to the actual dispensing thereof through the dispensing opening.

With the above and other objects in view that will hereinafter appear, the nature of the invention will be more clearly understood by the reference to the following detailed description, the appended claims and the several views illustrated in the accompanying drawing:

In the drawing:

FIGURE 1 is a fragmentary top perspective view of a novel dispensing container or dispenser constructed in accordance with this invention, and illustrates a closure secured to an upper body portion of a container body.

FIGURE 2 is an enlarged sectional view taken generally along line 2—2 of FIGURE 1, and illustrates a generally tubular projection of the container body directed toward a conical portion of an end wall of the closure.

FIGURE 3 is a sectional view taken generally along line 3—3 of FIGURE 2, and illustrates a dispensing opening formed in the closure opposite to the dispenser axis.

FIGURE 4 is an enlarged fragmentary sectional view taken generally along line 4—4 of FIGURE 1, and illustrates a generally converging passage of the dispensing opening.

FIGURE 5 is a sectional view of the dispenser taken generally along the line 2—2 of FIGURE 1, and illustrates the position of granular material in the closure upon the inverting of the dispenser.

FIGURE 6 is a fragmentary sectional view taken generally along the lines 2—2 of FIGURE 1 and illustrates the material being dispensed through the dispensing opening subsequent to repositioning the dispenser to an upright position.

A novel dispenser or dispensing container 10 constructed in accordance with this invention includes a container 11 and a closure 12, each of which is of a one-piece molded plastic construction. The container 11 and closure 12 are preferably constructed from polyethylene, but similar plastic material may be employed in lieu thereof.

The container 11 includes a container body 13 having an upper end portion 14 and a lower end portion (not shown) terminating in a bottom wall (also not shown). The upper end portion or upper body portion 14 of the container body 13 includes an externally threaded neck 15 terminating at a radially inwardly directed flange or shoulder 16 which is in turn joined by an integral radius portion 17 to an upwardly directed tubular portion 18 terminating in a peripheral free edge 20. The tubular portion 18 is generally cylindrical, as is best illustrated in FIGURE 3 of the drawing.

The closure 12 includes an end panel or wall 21 terminating at a depending peripheral skirt 22 which is internally threaded at 23. An annular flange or shoulder 24 of the peripheral skirt 22 is in intimate sealing contact with the shoulder 16 of the container body 13 to prevent a packaged product P (FIGURES 5 and 6) from leaking out of the dispenser 10 as will be more apparent hereafter. The threaded engagement of the closure 12 to the container 11 maintains the sealing surfaces of the shoulders 16, 24 in contact under a predetermined biasing force dependent upon the amount of force applied to secure the closure 12 to the container 11.

The end panel 21 of the closure 12 includes a generally conical central portion 25 terminating in an apex 26 directed toward and located centrally relative to the tubular portion 18 of the container body 13. When the dispenser 10 is initially inverted to the position illustrated in FIGURE 5 of the drawing a granular product P packaged in in the container 11 is discharged through the tubular portion 18 and is directed radially outwardly by a sloping surface 27 of the conical portion 25 to fill a generally first annular chamber 28 to a height generally corresponding to the distance between the free peripheral edge 20 of the tubular portion 18 and the remote-most portion of the end panel 21. When the dispenser 10 is tipped from the inverted position of FIGURE 5 to the upright position shown in FIGURE 2 a portion P1 of the product P in the annular chamber 28 passes into a second annular chamber 30 defined by a portion of the peripheral skirt 22, the shoulder 16, the radius portion 17 and the tubular portion 18. The portion P1 of the product P may then be dispensed from the chamber 30 through a dispensing opening or passage 31 after a membrane 32 (FIGURE 4) closing the passage 31 has been removed (FIGURE 6) and the dispenser 10 tipped from the position shown in FIGURE 2 to the position shown in FIGURE 6. As the predetermined portion P1 is being dispensed (FIGURE 6) the product P again begins to fill the annular chamber 28 and means 33 (FIGURE 6) in the form of a wall partially defining the dispensing passage 31 prevents the product P in the annular chamber 28 from being admixed with the predetermined portion P1 of the product being dispensed, as is clearly illustrated in FIGURE 6 of the drawing. The wall 33 is of a generally arcuate configuration (FIGURE 3) depending from the end panel 21 in the normally upright position of the dispenser 10, and terminates in a peripheral edge portion 34 terminating beneath the peripheral edge portion 20 of the tubular portion 18 of the container body 13. The wall 33 is also spaced quite close to the tubular portion 18 (FIGURE 3) and this arrangement in addition to the overlapping of the tubular portion 18 and the wall 33 prevents material flowing outwardly of the container body from admixing with the portion P1 being dispensed, as is clearly illustrated in FIGURE 6 of the drawing.

The dispensing passage 31 is also constructed to insure a rapid flow of the packaged product P during a dispensing operation. To achieve this end, the dispensing passage 31 includes a generally oval-shaped exit opening 35 opening outwardly through the end panel 21 of the closure 12 and a relatively larger entrance opening 36 which is of a generally shallow C-shaped configuration. Opposite surfaces 37, 38 converge toward each other between the entrance opening 36 and the exit opening 35, as is best illustrated in FIGURE 4 of the drawing.

From the foregoing, it will be seen that novel and advantageous provisions have been made for carrying out the desired end. However, attention is again directed to the fact that additional variations may be made in this invention without departing from the spirit and scope thereof as defined in the appended claims.

We claim:

1. A dispenser comprising a container and a closure, said container including a container body having upper and lower body portions, said upper body portion terminating in a tubular portion having a free peripheral edge, means securing said closure to said upper body portion, said closure being provided with an end panel and a depending peripheral skirt defining a first chamber, said tubular portion being directed toward said first chamber with the free peripheral edge thereof terminating short of said end panel whereby granular material in said body flows outwardly of the body through the tubular portion and fills a portion of said first chamber to a height corresponding generally to the distance between the end panel and the free peripheral edge upon the tipping of the dispenser from an upright to an inverted position, said peripheral skirt and tubular portion defining an annular chamber into which flows a predetermined portion of the material from said first chamber upon the subsequent tipping of the dispenser to its upright position, means for dispensing the material from said annular chamber through said closure, means for preventing material from being dispensed directly from said first chamber outwardly of said body when the dispenser is inverted and means for directing material radially outwardly during the passage thereof outwardly of said tubular portion.

2. A dispenser comprising a container and a closure, said container including a container body having upper and lower body portions, said upper body portion terminating in a tubular portion having a free peripheral edge, means securing said closure to said upper body portion, said closure being provided with an end panel and a depending peripheral skirt defining a first chamber, said tubular portion being directed toward said first chamber with the free peripheral edge thereof terminating short of said end panel whereby granular material in said body flows outwardly of the body through the tubular portion and fills a portion of said first chamber to a height corresponding generally to the distance between the end panel and the free peripheral edge upon the tipping of the dispenser from an upright to an inverted position, said peripheral skirt and tubular portion defining an annular chamber into which flows a predetermined portion of the material from said first chamber upon the subsequent tipping of the dispenser to its upright position, means for dispensing the material from said annular chamber through said closure, and means forming a portion of said end panel for directing material radially outwardly during the passage thereof outwardly of said tubular portion.

3. A dispenser comprising a container and a closure, said container including a container body having upper and lower body portions, said upper body portion terminating in a tubular portion having a free peripheral edge, means securing said closure to said upper body portion, said closure being provided with an end panel and a depending peripheral skirt defining a first chamber, said tubular portion being directed toward said first chamber with the free peripheral edge thereof terminating short of said end panel whereby granular material in said body flows outwardly of the body through the tubular portion and fills a portion of said first chamber to a height corresponding generally to the distance between the end panel and the free peripheral edge upon the tipping of the dispenser from an upright to an inverted position, said peripheral skirt and tubular portion defining an annular chamber into which flows a predetermined portion of the material from said first chamber upon the subsequent tipping of the dispenser to its upright position, means for dispensing the material from said annular chamber through said closure, means forming a portion of said end panel for directing material radially outwardly during the passage thereof outwardly of said tubular portion, and means for preventing material from being dispensed directly from said first chamber outwardly of said body when the dispenser is inverted.

4. The dispenser as defined in claim 2 wherein said material directing means is a generally conical portion of said end panel, and said conical portion includes an apex directed toward said tubular portion.

5. The dispenser as defined in claim 2 wherein said closure and said container body are each of a one-piece molded plastic construction.

6. A dispenser comprising a container and a closure, said container including a container body having upper and lower body portions, said upper body portion terminating in a tubular portion having a free peripheral edge, said closure being provided with an end panel and a depending peripheral skirt, said skirt including means for securing the closure to the upper body portion, said end panel having a central conical portion terminating in an apex directed toward said tubular portion, said conical portion and a portion of said peripheral skirt defining a first generally annular chamber, said free peripheral edge being spaced from the end panel and the conical portion thereof whereby granular material in said body flows axially and radially outwardly of the body through the tubular portion and fills a portion of the first chamber to a height corresponding generally to the distance between the end panel and the free peripheral edge upon the tipping of the dispenser from an upright to an inverted position, said peripheral skirt and tubular portion defining a second annular chamber into which flows a predetermined portion of the material from said first chamber upon the subsequent tipping of the dispenser to its upright position, said second annular chamber being closed by an annular shoulder of said container, said shoulder and a portion of said peripheral skirt being in sealing contact, means for dispensing the material from the annular chamber through said closure, said dispensing means being a passage offset from the axis of the closure, said passage being at least partially defined by a wall portion depending from said end panel and terminating beneath the peripheral edge of the tubular portion in the upright position of the dispenser, said passage including an entrance portion opening into said second annular chamber and an exit portion opening outwardly of said end panel, said passage converging from said entrance portion toward said exit portion, removable closure means closing said exit portion, and both said closure and container being each only of a single one-piece molded construction.

7. A dispensing closure comprising a closure body defined by an end panel and a peripheral skirt, means for securing said closure to a container, means in said end panel for dispensing flowable material therethrough, means internally of said closure for directing flowable material radially outwardly from the closure body axis when the dispensing closure is in an inverted position, said directing means being a conical inner surface of said end panel, said dispensing means being radially offset from the container body axis, said dispensing means including an axially disposed passage opening outwardly of said closure body through orifice means in said end panel, and said passage being defined at least in part by a wall projecting axially inwardly away from said end panel.

References Cited
UNITED STATES PATENTS

| | | | |
|---|---|---|---|
| 1,938,100 | 12/1933 | Gessler | 222—455 |
| 2,091,929 | 8/1937 | Kappenberg | 222—455 |
| 2,787,405 | 4/1957 | Shvetz | 222—455 |

ROBERT B. REEVES, *Primary Examiner.*

F. R. HANDREN, *Assistant Examiner.*